United States Patent [19]

Kammel et al.

[11] 4,049,757

[45] Sept. 20, 1977

[54] PROCESS FOR THE PRODUCTION OF SHAPED BODIES FROM POLYOLEFINS

[75] Inventors: Gernot Kammel, Erlangen; Rudolf Wiedenmann, Nurnberg, both of Germany

[73] Assignee: Siemens Aktiengesellschaft, Munich, Germany

[21] Appl. No.: 572,516

[22] Filed: Apr. 28, 1975

[30] Foreign Application Priority Data

Apr. 29, 1974 Germany .......................... 2420784

[51] Int. Cl.$^2$ .............................................. B01J 1/10
[52] U.S. Cl. ................... 264/22; 204/159.17; 264/25; 264/236; 264/DIG. 18
[58] Field of Search .................. 264/22, 25, DIG. 18, 264/236; 204/159.17; 526/227

[56] References Cited

U.S. PATENT DOCUMENTS

| | | | |
|---|---|---|---|
| 3,125,546 | 3/1964 | Pinner et al. | 204/159.17 |
| 3,294,869 | 12/1966 | Robinson | 204/159.17 |
| 3,640,915 | 2/1972 | Cooper | 260/2.5 R |
| 3,817,851 | 6/1974 | Atchison et al. | 204/159.17 |

FOREIGN PATENT DOCUMENTS

2,221,526  11/1973  Germany ........................... 264/22

*Primary Examiner*—Jeffery R. Thurlow
*Attorney, Agent, or Firm*—Kenyon & Kenyon, Reilly, Carr & Chapin

[57] ABSTRACT

The invention provides a process for the production of shaped bodies and semi-finished products from polyolefins in the presence of crosslink-reinforcing coagents by addition of 0.01 to 1.0 wt % of at least one organic polymer-active radical forming agent, and brief heating with shaping before radiation to above the decomposition temperature of the radical forming agent until the radical forming agent decomposes.

The process serves for the production of pipes, shaped sections and sheaths by extrusion, injection molding or extrusion pressing, especially for electric insulations, in particular for cables and lines.

8 Claims, No Drawings

PROCESS FOR THE PRODUCTION OF SHAPED BODIES FROM POLYOLEFINS

BACKGROUND OF THE INVENTION

This invention is concerned with a process for the production of shaped-bodies and semi-finished products from polyolefins crosslinkable by high energy radiation.

Because of their good mechanical and electrical properties, thermoplastic polyolefins are used in many areas of technology. In many cases, however, the plastics used no longer meet today's increased requirements.

For some years now it has been possible to crosslink ethylene homo- and co-polymers such as ethylene-vinyl acetate (EVA), ethylene-propylene rubber (EPM) or ethylene-propylenediene terpolymers (EPDM) more or less intensively depending on the respective crosslinking method. Such crosslinkage is accompanied primarily by greater thermostability, reduced solubility in organic solvents, and increased resistance to mechanical stresses. The excellent dielectric properties of the polymers are not impaired by the crosslinking process or only insignificantly so. These improvements of the properties caused by crosslinking open up new technical applications for these materials.

The crosslinkage of polyolefins by action of high-energy radiation, e.g. beta, gamma or x-rays, is known. Sources of such radiation are electron accelerators, x-ray installations, radioactive isotopes, and nuclear reactors.

For a technically sufficient crosslinkage of low density polyethylene (LDPE), for example, a radiation dose of 200 – 300 kJ/kg ($\triangleq$ 20–30 Mrd) must be applied. Since the required energy (kJ/kg is a highly relevant factor in the cost analysis of any technical process based on radiation crosslinking, one endeavors to lower the dose required for technically sufficient crosslinking by additional measures. For example, according to German Offenlegungsschriften 1,544,804 and 1,544,805, polyfunctional olefin-unsaturated, i.e. ethylenically unsaturated monomeric compounds which act as crosslinking or vulcanization accelerators are used to lower the dose. The polyfunctional ethylenically unsaturated monomers which are used belong to the class of diacrylic and dimethacrylic acid esters of mono-, di-, tri- and tetra-ethylene glycol, as well as their vinyl and allyl esters; divinyl compounds such as divinyl benzene or diethylene-glycol divinyl ether, diallyl esters of maleic acid or malonic acid, diallyl compounds of pentaerythritol, triallyl cyanurate and related homologs and mixtures thereof.

Although a reduction of the radiation dose required for a technically sufficient crosslinkage can be brought about by addition of such coagents, i.e. polyfunctional olefinic monomers to the polymer before crosslinking, this method has a number of considerable disadvantages.

The reasons for these disadvantages lie particularly in the chemical nature of the monomers, i.e. the coagents. The above-mentioned polyfunctional olefin-unsaturated monomers are all polar compounds. They are largely insoluble in polyolefins of nonpolar structure, and consequently they gradually migrate from the as yet uncrosslinked polymer to the polymer surface where they appear as small droplets. This phenomenon is known as sweating. This sweating effect is visible already a few hours after the shaping and even at coagent concentrations of less than 1%, and it becomes more and more evident with increasing coagent content. This is even more significant since it is known that with increasing content of the coagent the radiation dose required for effective crosslinkage decreases.

The result is that a shaped body not yet crosslinked, produced for example by injection molding or by extrusion of a mixture, even if properly stabilized, of polyolefin with a polyfunctional olefin-unsaturated monomer, has little storage stability until it is crosslinked with high-energy radiation. This fact proves extremely disadvantageous especially if crosslinking is carried out separately in time from the shaping, as is the case in an intermittent process. During the storage time, due to continuous reduction of the coagent concentration in the polyolefin, the mixture ratio and hence also the energy required for radiation crosslinking changes. This leads to unpredictable results of the crosslinking process and effects the properties of the finished, shaped bodies.

The coagents, i.e. the olefinic monomers generally used, even in liquid or solid form, are usually skin-irritants and are somewhat toxic substances which adversely affects the handling of the non-crosslinked shaped parts.

SUMMARY OF THE INVENTION

The described disadvantages in the production of shaped bodies of polyolefins crosslinkable by high-energy rays in the presence of crosslink-reinforcing coagents such as the poly-functional ethylenically unsaturated monomers previously mentioned can be largely avoided if, according to the invention, the mixture of polyolefin and coagent is admixed with 0.01 to 1.0 wt. %, preferably 0.05 to 0.5 wt %, based on the weight of the polyolefin, of at least one organic polymer-active radical forming agent; heating the so-formed mixture during or after shaping to above the decomposition temperature of the organic polymer-active radical forming agent until the latter decomposes, and subsequently irradiating the shaped material whith high-energy radiation. The required temperature to decompose the radical forming agent depends on the type and hence the thermal stability of the radical forming agent used. Besides the crosslink-reinforcing coagents and the small amounts of organic polymer-active radical forming agents the polyolefins may also contain age-resistors, such as antioxidants or metal deactivators, plasticizing oils or other additions of low molecular weight, mineral fillers, carbon blacks or color pigments.

By the addition, according to the invention, of organic polymer-active radical forming agents, the migration of the coagent out of the polyolefin is completely suppressed even at high concentrations, and the radiation dose required for technically sufficient crosslinkage can be reduced significantly.

The shaping can be done by extrusion, injection molding or extrusion pressing as known in the art, the finished shaped part or extrusion being then brought to the temperature required for the thermal decomposition of the organic polymer-active radical forming agent used, if one operates at processing temperatures at which the organic polymer-active radical forming agent used does not yet undergo thermal decomposition.

It has been found to be especially advantageous to carry out the shaping at a processing temperature which ensures extensive decomposition of the organic polymer-active radical forming agent within the given processing time.

DESCRIPTION OF THE PREFERRED EMBODIMENTS

In the production of shaped bodies from the mixture of polyolefins, crosslinking-intensifying monomers, i.e. crosslink-reinforcing coagents, and organic polymer-active radical forming agents according to the invention, an oligomerization of the added polyfunctional unsaturated coagents occurs but not crosslinking of the polyolefin, whereby the processing of these mixtures at temperatures at which the organic polymer-active radical forming agent decomposes is ensured. This is essentially different from the crosslinking disclosed in French Pat. No. 1,424,016 of polyethylenes and ethylene copolymers in the presence of an organic peroxide, the peroxide leading directly to the partial crosslinking of the polyolefin. Partially crosslinked polyolefins are no longer processable. Moreover, the process of the French patent provides firstly a treatment with high-energy radiation and then a re-hardening at 150° C.

Suitable organic polymer-active radical forming agents for the invention include diaryl peroxides, as for example, dicumyl peroxide. Especially suitable radical forming agents particularly with regard to extrusion processes at temperatures favorable from a process-technology point of view are alkaryl peroxides, in particular 1,3-bis-(t-butyl peroxisopropyl) benzene, and dialkyl peroxides, especially di-t-butyl peroxide.

Suitable olefin polymers crosslinkable by high-energy radiation are for example olefin homopolymers, such as polyethylene, polypropylene and polybutene, olefin copolymers, such as ethylene-propylene rubber or ethylene-vinyl acetate, and olefin terpolymers, such as ethylene-propylene-diene polymers (EPDM rubber) and mixtures thereof.

Suitable crosslinking-intensifying monomers are polyfunctional olefin-unsaturated compounds, as for example di-allyl esters of organic carboxylic acids such as decane-dicarboxylic acid-1,10- diallyl ester, oleic acid diallyl ester; allyl ethers, such as diallylidine pentaerythritol, novolacallyl ether, acrylates or methacrylates, for example those of mono-, di-, tri- and tetra-ethylene glycol, of the bi- or polyvalent alcohols such as 1,6-hexandiol or trimethylol propane; alkyl cyanurates such as triallyl cyanurate, triallyl-isocyanurate and their mono- and bis-diallyl cyanurates, as for example stearyl amidodiallyl cynaurate, or diamino-hexane-bis-diallyl cyanurate; N,N-diallyl melamine, or dimaleimides, as for example dodecane-dimaleimides.

The outstanding advantage of the shaped bodies produced by the method of this invention is that the migration of coagent from the shaped bodies before the crosslinking with high-energy rays is completely suppressed. The broad use of coagents in polyolefins crosslinkable by radiation with high-energy rays in a subsequent step, or also separated in time and space, becomes possible by using the present method.

Uncrosslinked shaped parts produced according to the invention become stable until crosslinked by radiation, and the above mentioned adverse effects in the handling of these shaped parts are eliminated. The coagent concentration in the mixture composition no longer decreases continuously, a fact which in the case of radiation crosslinking until now led to unpredictable and insufficient crosslinking results.

Moreover, by virtue of this invention, the mechanical strength of the largely uncrosslinked thermoplastic material is increased, which is of advantage especially when for process-technological reasons such stress cannot be precluded or avoided from the start.

The crosslinking according to the process of the present invention occurs at a dose of about 1 to 200 kJ/kg, preferably 10 to 100 kJ/kg. The crosslinking is thereby carried out under mild radiation conditions, and depending on the dose rate it is immaterial whether radiation occurs in an atmospheric medium or under inert gas. Thus the danger of undesired decomposition of the ethylene homo- and copolymers can be diminished and the extremely disadvantageous radiation damage of additives such as oxidation stabilizers and metal deactivators can be reduced.

The process of the invention is suitable for the production of any shaped bodies and semi-finished products, such as pipes, shaped sections or sheaths, by extrusion, injection molding or extrusion pressing. The invention is used to special advantage for electric insulations, particularly for cables and lines, where for example by repeated deflection of the conductor to be crosslinked under the radiation window of the electron accelerator, the uncrosslinked insulation is exposed to high mechanical stress. The invention will be explained more fully in the following examples.

As a source of radiation a 750 kV cascade electron accelerator of an electron beam power of 4 kW was used for the crosslinking. The radiations were carried out in each case in an atmospheric medium and at room temperature. On the basis of the selected energy dose rates (0.3 to 1.1 kJ/kg sec) the radiations may be termed as under short-term conditions per DIN 53,751 (Draft of August 1973). The dose values mentioned in the following are stated in Mrd. One Mrd equals 10 kJ/kg.

EXAMPLE 1 a. From a commercial high-pressure polyethylene (LDPE, $d = 0.918$ g/cc, $MFI_{190/2} = 0.2$) 1 mm thick pressboards of dimensions 70 × 120 mm were produced at 180° /3 min and crosslinked with an energy dose of 6, 10 and 20 Mrd. The percent crosslinking was 49%, 61% and 72%. The percent crosslinking determined as a measure of the degree of crosslinking of the polyolefin was obtained as follows:

About 0.3 g of the crosslinked polyolefin was extracted in the form of sample bodies of a diameter of about 1 mm in stabilized boiling xylene for 12 hours and the insoluble portion (gel portion) was then dried under vacuum for 12 hours at 110° C. The value of the percent crosslinking was then calculated as follows:

$$\text{Percent crosslinking} = \frac{\text{Weight of extracted sample}}{\text{Weight of starting sample}} \times 100\%$$

The boards were crosslinked homogeneously and indicated practically the same degree of crosslinking in samples taken at different points of the board.

b. 100 parts by weight of the low density polyethylene as in (a) above were plasticized at 150° C in a heatable laboratory type internal mixer, admixed with 1.7 parts by weight of triallyl cyanurate (TAC), and homogenized for 3 minutes at this temperature. At 180°/3 m in the mixture was then processed to pressboards about 1 mm thick and a portion thereof crosslinked with 6, 10, and 20 Mrd to a percent crosslinking of 60%, 69%, and 77% respectively.

c. To the mixture described under (b) was added in a second operation at a mixer temperature of 150° C, 0.1 parts by weight of dicumyl peroxide (DCP, 96%) and the mixture was homogenized for 1 minute. A portion of the 1 mm boards pressed therefrom at 180°/3 min were again radiated with 6, 10 and 20 Mrd. The percent crosslinking was clearly higher at 71%, 77% and 83% respectively.

d. In a third operation, dicumyl peroxide was incorporated in the mixture described under (b), analogously to (c) but at 0.2 parts by weight. Radiation of a pressboard made at 180°/3 min with 10 Mrd lead to more than 80% crosslinking.

Besides this obvious promotion of the crosslinking, the small amount of peroxide prevented the sweating of the coagent out of the not yet radiated boards (c) an (d). While the coagent triallyl cyanurate, migrated out of the non-crosslinked boards worked according to (b) after a few hours and collected as drops on the surface, the crosslinking intensifier (crosslink-reinforcing coagent) did not migrate out of the boards (c) and (d) also not yet radiated. Even after weeks of storage, the boards remained dry.

EXAMPLE 2

The procedure was followed as in example 1, except that instead of 1.7 parts by weight (TAC), double the quantity (3.4 parts by weight) of triallyl cyanurate was used.

It was found that the sweating phenomenon on the unradiated boards of the mixture without peroxide increased with increasing monomer, i.e. coagent concentration. On the boards of the mixtures with a small quantity of dicumyl peroxide not yet crosslinked by radiation this migration phenomenon did not occur at all. Moreover, the boards radiated with 6 Mrd (180°/3 min) of the mixture containing 0.2 parts by weight of dicumyl peroxide were crosslinked almost 80%, whereas those without peroxide showed only a crosslinking of 62%.

EXAMPLE 3 a. In 100 parts by weight of a LD polyethylene ($d=$ 0.918 g/cc; MFI $_{190/2}$ = 0.2) 0.2 parts by weight of the oxidation stabilizer, Agerite Resin D, were incorporated on a laboratory mixer at 150°. Sample boards were pressed according to example 1 at 180°/3 min, and these were crosslinked with 10 Mrd.

This yielded a percent crosslinking of 54%.

b. In a second operation, 1.7 parts by weight of triallyl cyanurate were added to the mixture described under (a) at a mixer temperature of 150° and homogenized for 3 minutes. A portion of the boards made therefrom at 180°/3 min was radiated with 10 Mrd. They are homogeneously crosslinked to an extent of 65%.

c. In a further operation, 0.2 parts by weight of the dicumyl peroxide according to example 1 were additionally incorporated in mixture (b) and the degree of crosslinking of the boards pressed therefrom at 180°/3 min determined after radiation with 10 Mrd. They were homogeneously crosslinked 79%.

It could be demonstrated again that the not yet radiated pressboards of mixture (c) showed no sweating even after storage for several weeks, whereas the coagent migrated extensively out of the boards pressed according to mixture (b) and not radiated after a short time.

EXAMPLE 4

The preparation of the mixture was the same as in example 1 (b) to (d), but using 4 parts by weight of the crosslinking intensifier trimethylol propanetrimethacrylate (TRIM), instead of triallyl cyanurate.

Without peroxide addition the degree of crosslinking of the boards pressed at 180°/3 min and radiated with 10 Mrd was 62%. When 0.1 or 0.2 parts by weight of dicumyl peroxide was added to the mixtures, the radiation of the pressboards (180°/3 min) with 10 Mrd lead to a percent crosslinking of 64% and 65%, respectively.

Thus the addition of a small quantity of peroxide to the mixture of LDPE and trimethylol propanetrimethacrylate suppressed the migration of the coagent from the not yet radiated shaped body.

EXAMPLE 5

The preparation of the mixture was as in example 4, but using 2.2 parts by weight of the crosslinking intensifier diallylidene pentaerythritol (DAPE), instead of trimethylol propane trimethacrylate.

Without peroxide addition the degree of crosslinking of the boards pressed at 180°/3 min and radiated with 10 Mrd was 70%. The radiation of analogously prepared boards of mixtures containing 0.1 or 0.2 parts by weight of dicumyl peroxide with 10 Mrd lead to a 80% and 81% crosslinking respectively.

From the unradiated boards of the mixture without organic peroxide, diallylidene pentaerythrital migrates increasingly a few days after shaping. By admixing a small quantity of dicumyl peroxide the migration from the bodies is suppressed completely.

EXAMPLE 6

The procedure as in example 1 was followed except that as polyolefin a commercial low pressure polyethylene (HDPE, $d$ = 0.945g/cc MFI$_{190/2}$ = 0.2) was used, and as the crosslinking intensifying monomer, 3.4 parts by weight of triallyl cyanurate per 100 parts by weight of HDPE was used.

Radiation of the respective pressboards (180°/3 min) with 10 Mrd lead in the base material wthout TAC to 44% crosslinking, by addition of 3.4 parts by weight of triallyl cyanurate to 44%, and after further addition of 0.2 parts by weight of dicumyl peroxide to 84% crosslinking. In addition, the distinct migration of the coagent out of the nonpolar polyethylene, more crystalline compared with LDPE, was suppressd completely.

EXAMPLE 7

One hundred parts by weight of a commercial EVA copolymer ($d$ = 0.980 g/cc; 45% vinyl acetate; MFI$_{190/2}$ = 2.5) was homogenized in 3 minutes at 150° in a heatable laboratory mixer with 3.4 parts by weight of triallyl cyanurate, and from this mixture pressboards 1 mm thick were made at 180°/3 min. The boards are highly tacky, but show after radiation with 6 and 10 Mrd a homogeneous crosslinking of 51% and 63%.

In a second operation, 0.2 parts by weight of dicumyl peroxide was additionally incorporated in mixture(a) at a mixing temperature of 150°. The pressboards made therefrom (180°/3 min) were much less tacky, showed a higher mechanical strength and after radiation with 6 and 10 Mrd are homogeneously and considerably more crosslinked, namely 85% and 88%, respectively. The improvement became still more obvious when comparing therewith the precent crosslinking of the EVA material without those additions after radiation with the above-mentioned dose values: 52% and 71%.

EXAMPLE 8

Similarly to example 7, two mixtures were prepared using, instead of ethylene vinyl acetate, a commercial ethylene-propylene rubber (EPM containing 45% propylene, $d = 0.87$ g/cc ML $(1 + 4)\ 125° = 35$) as the polyolefin.

The pressboards (180°/3 min of the mixture of 100 parts by weight EPM + 3.4 parts by weight triallyl cyanurate could be crosslinked 64% with 10 Mrd, whereas the sample bodies of the mixture containing additionally 0.2 parts by weight of dicumyl peroxide were crosslinked 74% with 10 Mrd. Radiation of the pure base polyolefin yielded only 46%.

Again the admixture of the small quantity of dicumyl peroxide prevented the migration on the coagent and increased the mechanical strength of the not yet radiated sample bodies.

EXAMPLE 9

Similarly to example 7, two mixtures were prepared, based on a commercial ethylene-propylene-diene terpolymer (EPDM containing 45% propylene, $d = 0.87$ g/cc, 5% dicyclopentadiene as the teritary component and ML $(1 + 4)\ 125°° = 50$).

The pressboards (180°/3 min) of the mixture of 100 parts by weight of EPDM and 3.4 parts by weight of triallyl cyanurate were crosslinkable with 10 Mrd 63%, whereas the sample bodies of the mixture containing additionally 0.2 parts by weight of dicumyl peroxide were crosslinked 75% with this dose. In contrast, radiation of the base polyolefin with 10 Mrd lead to a 69% crosslinking.

The admixture of the small quantity of the organic peroxide brings about a clearly higher mechanical strength of the not yet radiated bodies, reduces its tackiness and thus favors its handling.

EXAMPLE 10

The procedure used was as in example 2, except that instead of dicumyl peroxide, 0.1 parts by weight of 1,3-bis (tertbutylperoxisopropyl)-benzene (96%) was used as the organic polymer-active radical forming agent.

The coagent triallyl cyanurate did not migrate out of the not yet radiated sample boards (180°/3 min) of this mixture, in contrast to similarly prepared pressboards of the mixture without 1,3-bis(tert.butylperoxisopropyl)-benzene, where the monomer sweated out after a few hours. Besides, the boards of the mixture with 0.1 parts by weight of 1,3-bis(tert-butylperoxisopropyl)-benzene could be crosslinked more than 80% by radiation with 10 Mrd, while those without the stated peroxide showed only a crosslinking of 69%.

EXAMPLE 11

One hundred parts by weight of a commercial high pressure polyethylene ($d = 0.918$ g/cc $MFI_{190/2} = 0.2$) was intimately mixed in a drum mixer for 12 hours with 3.4 parts by weight of triallyl cyanurate and 0.2 parts by weight of 1,3-bis(tert-butylperoxisopropyl)-benzene )96%) at a temperature of 60° C.

A portion of the mixture thus obtained was homogenized over a mixing extruder at a batch temperature of 180° C and turned out as a continuous extrusion. From this body the coagent did not migrate even after several weeks of storage.

In a second operation, the other part of the drummed mixture was homogenized in the same manner but at only 130° C, and after cooling the extrusion issuing from the mixing extruder was granulated. After a few hours the granulate was wet and tacky from migrated coagent.

EXAMPLE 12

One hundred parts by weight of high pressure polyethylene ($d = 0.918$ g/cc; $MFI_{190/2} = 0.2$) was intimately mixed in a drum mixer at 60° C over a period of 12 hours with 3.4 parts by weight of triallyl cyanurate.

This mixture was extruded over a 90D extruder at a batch temperature of 180° C around a copper conductor of a cross-section of 1.5 mm². During the extrusion operation, di-tert-butylperoxide was continuously added directly at the extruder over a proportioning feeder, in such a way that the extruded mixture contained 0.2 parts by weight based on the weight of the polyethylene.

The homogeneous insulation thus obtained (insulation wall thickness 0.8 mm), from which the monomer did not sweat out even after several weeks of storage, could subsequently be crosslinked by electron beams.

In contrast, from the insulation extruded similarly but at a batch temperature of 130° C the coagent started to migrate out after a few hours.

What is claimed is:

1. A process for the production of shaped bodies and semi-finished products from olefin homopolymers and copolymers crosslinkable by high energy radiation in the presence of a polyfunctional ethylenically unsaturated monomer capable of reducing the radiation dosage for cross-linking said olefin polymer comprising:

a. forming a mixture of said olefin polymer, monomer and from 0.05 to 0.5% based on the weight of the said olefin polymer of at least one heat decomposable organic polymer active radical forming agent;

b. shaping said mixture and heating said mixture during or after shaping at a temperature above the decomposition temperature of said radical forming agent until said agent decomposes and a shaped crosslinkable body is formed whereby oligomerization of said monomer occurs so as to substantially prevent migration of said monomer to the surface of said shaped body; and c. crosslinking said shaped body with high energy radiation.

2. The process of claim 1 wherein 1,3-bis(tert-butylperoxisopropyl)-benzene is the organic polymer-active radical forming agent.

3. The process of claim 1 wherein di-tert-butyl peroxide is the organic polymer-active radical forming agent.

4. A process for the production of shaped bodies and semi-finished products from olefin homopolymers and copolymers crosslinkable by high energy radiation in the presence of a polyfunctional ethylenically unsaturated monomer capable of reducing the radiation dosage for croslinking said olefin polymer comprising:

a. forming a mixture of said olefin polymer, monomer and from 0.05 to 0.5% based on the weight of said olefin polymer of at least one organic polymer-active radical forming agent selected from the group consisting of diaryl peroxides, alkaryl peroxides, and dialkyl peroxides;

b. shaping said mixture and heating said mixture during shaping at a temperature above the decomposition temperature of said radical forming agent until said agent decomposes and a shaped crosslinkable body is formed whereby oligomerization of said monomer occurs so as to substantially prevent migration of said monomer to the surface of said shaped body; and c. crosslinking said shaped body with high energy radiation.

5. The method of claim 4 wherein said diaryl peroxide is dicumyl peroxide.

6. The method of claim 4 wherein said alkaryl peroxide is 1,3-bis (t-butylperoxisopropyl)benzene.

7. The method of claim 4 wherein said dialkyl peroxide is di-tert-butylperoxide.

8. A process for the production of shaped bodies and semi-finished products from olefin homopolymers and copolymers crosslinkable by high energy radiation in the presence of a polyfunctional ethylenically unsaturated monomer selected from the group consisting of di-allyl esters of organic carboxylic acids, allyl ethers, acrylate or methacrylate esters of an alcohol selected from the group consisting of mono di-, tri- and tetraethylene glycols and bi- or polyvalent alcohols, allyl cyanurates, N,N-diallyl melamine and dimaleimides comprising:

a. forming a mixture of said olefin polymer, monomer and from 0.05 to 0.5% based on the weight of said olefin polymer of at least one organic polymer active radical forming agent selected from the group consisting of dicumyl peroxide, 1,3-bis(tert-butyl peroxisopropyl) benzene and di-t-butylperoxide b. shaping said mixture and heating said mixture during shaping at a temperature above the decomposition temperature of said radical forming agent until said agent decomposes and a shaped crosslinkable body is formed whereby oligomerization of said monomer occurs so as to substantially prevent migration of said monomer to the surface of said shaped body; and c. crosslinking said shaped body with high energy radiation.

* * * * *